(12) United States Patent
Hamakubo et al.

(10) Patent No.: US 9,005,782 B2
(45) Date of Patent: Apr. 14, 2015

(54) MAGNETIC DISK AND METHOD OF MANUFACTURING THE SAME

(75) Inventors: Katsushi Hamakubo, Shinjuku-ku (JP); Kae Itoh, Shinjuku-ku (JP)

(73) Assignee: WD Media, LLC, Irvine, CA (US)

( * ) Notice: Subject to any disclaimer, the term of this patent is extended or adjusted under 35 U.S.C. 154(b) by 572 days.

(21) Appl. No.: 12/744,829

(22) PCT Filed: Mar. 27, 2009

(86) PCT No.: PCT/JP2009/056244
§ 371 (c)(1),
(2), (4) Date: May 26, 2010

(87) PCT Pub. No.: WO2009/123037
PCT Pub. Date: Oct. 8, 2009

(65) Prior Publication Data
US 2011/0026162 A1 Feb. 3, 2011

(30) Foreign Application Priority Data
Mar. 30, 2008 (JP) .................................. 2008-088951

(51) Int. Cl.
*G11B 5/65* (2006.01)
*G11B 5/725* (2006.01)
*C10M 107/38* (2006.01)
*G11B 5/84* (2006.01)

(52) U.S. Cl.
CPC ............. *G11B 5/725* (2013.01); *C10M 107/38* (2013.01); *C10M 2213/043* (2013.01); *C10N 2230/06* (2013.01); *C10N 2240/204* (2013.01); *G11B 5/8408* (2013.01)

(58) Field of Classification Search
None
See application file for complete search history.

(56) References Cited

U.S. PATENT DOCUMENTS

| 5,374,480 A | * | 12/1994 | Nishikawa et al. | ........... 428/336 |
|---|---|---|---|---|
| 6,013,161 A | | 1/2000 | Chen et al. | |
| 6,063,248 A | | 5/2000 | Bourez et al. | |
| 6,068,891 A | | 5/2000 | O'Dell et al. | |
| 6,086,730 A | | 7/2000 | Liu et al. | |
| 6,099,981 A | | 8/2000 | Nishimori | |
| 6,103,404 A | | 8/2000 | Ross et al. | |

(Continued)

FOREIGN PATENT DOCUMENTS

| JP | 62-066417 A | | 3/1987 | |
|---|---|---|---|---|
| JP | 1-271908 A | | 10/1989 | |
| JP | 6-004857 A | | 1/1994 | |
| JP | 07-326042 | | 12/1995 | |
| JP | 08-319492 | | 12/1996 | |
| JP | 2002074648 A | | 3/2002 | |
| JP | 2003162810 A | * | 6/2003 | ............. G11B 5/725 |
| JP | 2007/284659 A | | 11/2007 | |
| JP | 2008-047284 | | 2/2008 | |
| WO | 2004/031261 A1 | | 4/2004 | |

OTHER PUBLICATIONS

Machine Translation: Saito et al. (US JP 2003-162810).*
Written Opinion and Search Report for Singapore Patent Application No. 201003777-8 dated Nov. 21, 2011, 18 pages.
Japanese Office Action dated Jul. 30, 2013 for related Japanese Application No. 2008-088951, 6 pages.

*Primary Examiner* — Holly Rickman
*Assistant Examiner* — Linda Chau

(57) ABSTRACT

Provided is a magnetic disk that is excellent in durability, particularly in LUL durability and CFT properties, and thus has high reliability despite the low flying height of a magnetic head following the rapid increase in recording density in recent years and despite the very strict environmental resistance following the diversification of applications. A magnetic disk (10) has at least a magnetic layer (6), a carbon-based protective layer (7), and a lubricating layer (8) provided in this order over a substrate (1). The lubricating layer (8) contains a compound having a perfluoropolyether main chain in a structure thereof and having a polar group other than at ends of a molecule thereof.

11 Claims, 1 Drawing Sheet

(56) References Cited

U.S. PATENT DOCUMENTS

| | | | |
|---|---|---|---|
| 6,117,499 | A | 9/2000 | Wong et al. |
| 6,136,403 | A | 10/2000 | Prabhakara et al. |
| 6,143,375 | A | 11/2000 | Ross et al. |
| 6,145,849 | A | 11/2000 | Bae et al. |
| 6,146,737 | A | 11/2000 | Malhotra et al. |
| 6,149,696 | A | 11/2000 | Jia |
| 6,150,015 | A | 11/2000 | Bertero et al. |
| 6,156,404 | A | 12/2000 | Ross et al. |
| 6,159,076 | A | 12/2000 | Sun et al. |
| 6,164,118 | A | 12/2000 | Suzuki et al. |
| 6,200,441 | B1 | 3/2001 | Gornicki et al. |
| 6,204,995 | B1 | 3/2001 | Hokkyo et al. |
| 6,206,765 | B1 | 3/2001 | Sanders et al. |
| 6,210,819 | B1 | 4/2001 | Lal et al. |
| 6,216,709 | B1 | 4/2001 | Fung et al. |
| 6,221,119 | B1 | 4/2001 | Homola |
| 6,248,395 | B1 | 6/2001 | Homola et al. |
| 6,261,681 | B1 | 7/2001 | Suekane et al. |
| 6,270,885 | B1 | 8/2001 | Hokkyo et al. |
| 6,274,063 | B1 | 8/2001 | Li et al. |
| 6,283,838 | B1 | 9/2001 | Blake et al. |
| 6,287,429 | B1 | 9/2001 | Moroishi et al. |
| 6,290,573 | B1 | 9/2001 | Suzuki |
| 6,299,947 | B1 | 10/2001 | Suzuki et al. |
| 6,303,217 | B1 | 10/2001 | Malhotra et al. |
| 6,309,765 | B1 | 10/2001 | Suekane et al. |
| 6,358,636 | B1 | 3/2002 | Yang et al. |
| 6,362,452 | B1 | 3/2002 | Suzuki et al. |
| 6,363,599 | B1 | 4/2002 | Bajorek |
| 6,365,012 | B1 | 4/2002 | Sato et al. |
| 6,381,090 | B1 | 4/2002 | Suzuki et al. |
| 6,381,092 | B1 | 4/2002 | Suzuki |
| 6,387,483 | B1 | 5/2002 | Hokkyo et al. |
| 6,391,213 | B1 | 5/2002 | Homola |
| 6,395,349 | B1 | 5/2002 | Salamon |
| 6,403,919 | B1 | 6/2002 | Salamon |
| 6,408,677 | B1 | 6/2002 | Suzuki |
| 6,426,157 | B1 | 7/2002 | Hokkyo et al. |
| 6,429,984 | B1 | 8/2002 | Alex |
| 6,482,330 | B1 | 11/2002 | Bajorek |
| 6,482,505 | B1 | 11/2002 | Bertero et al. |
| 6,500,567 | B1 | 12/2002 | Bertero et al. |
| 6,528,124 | B1 | 3/2003 | Nguyen |
| 6,548,821 | B1 | 4/2003 | Treves et al. |
| 6,552,871 | B2 | 4/2003 | Suzuki et al. |
| 6,565,719 | B1 | 5/2003 | Lairson et al. |
| 6,566,674 | B1 | 5/2003 | Treves et al. |
| 6,571,806 | B2 | 6/2003 | Rosano et al. |
| 6,628,466 | B2 | 9/2003 | Alex |
| 6,664,503 | B1 | 12/2003 | Hsieh et al. |
| 6,670,055 | B2 | 12/2003 | Tomiyasu et al. |
| 6,682,807 | B2 | 1/2004 | Lairson et al. |
| 6,683,754 | B2 | 1/2004 | Suzuki et al. |
| 6,730,420 | B1 | 5/2004 | Bertero et al. |
| 6,743,528 | B2 | 6/2004 | Suekane et al. |
| 6,759,138 | B2 | 7/2004 | Tomiyasu et al. |
| 6,778,353 | B1 | 8/2004 | Harper |
| 6,795,274 | B1 | 9/2004 | Hsieh et al. |
| 6,855,232 | B2 | 2/2005 | Jairson et al. |
| 6,857,937 | B2 | 2/2005 | Bajorek |
| 6,893,748 | B2 | 5/2005 | Bertero et al. |
| 6,899,959 | B2 | 5/2005 | Bertero et al. |
| 6,916,558 | B2 | 7/2005 | Umezawa et al. |
| 6,939,120 | B1 | 9/2005 | Harper |
| 6,946,191 | B2 | 9/2005 | Morikawa et al. |
| 6,967,798 | B2 | 11/2005 | Homola et al. |
| 6,972,135 | B2 | 12/2005 | Homola |
| 7,004,827 | B1 | 2/2006 | Suzuki et al. |
| 7,006,323 | B1 | 2/2006 | Suzuki |
| 7,016,154 | B2 | 3/2006 | Nishihira |
| 7,019,924 | B2 | 3/2006 | McNeil et al. |
| 7,045,215 | B2 | 5/2006 | Shimokawa |
| 7,070,870 | B2 | 7/2006 | Bertero et al. |
| 7,090,934 | B2 | 8/2006 | Hokkyo et al. |
| 7,099,112 | B1 | 8/2006 | Harper |
| 7,105,241 | B2 | 9/2006 | Shimokawa et al. |
| 7,119,990 | B2 | 10/2006 | Bajorek et al. |
| 7,147,790 | B2 | 12/2006 | Wachenschwanz et al. |
| 7,161,753 | B2 | 1/2007 | Wachenschwanz et al. |
| 7,166,319 | B2 | 1/2007 | Ishiyama |
| 7,166,374 | B2 | 1/2007 | Suekane et al. |
| 7,169,487 | B2 | 1/2007 | Kawai et al. |
| 7,174,775 | B2 | 2/2007 | Ishiyama |
| 7,179,549 | B2 | 2/2007 | Malhotra et al. |
| 7,184,139 | B2 | 2/2007 | Treves et al. |
| 7,196,860 | B2 | 3/2007 | Alex |
| 7,199,977 | B2 | 4/2007 | Suzuki et al. |
| 7,208,236 | B2 | 4/2007 | Morikawa et al. |
| 7,220,500 | B1 | 5/2007 | Tomiyasu et al. |
| 7,229,266 | B2 | 6/2007 | Harper |
| 7,239,970 | B2 | 7/2007 | Treves et al. |
| 7,252,897 | B2 | 8/2007 | Shimokawa et al. |
| 7,277,254 | B2 | 10/2007 | Shimokawa et al. |
| 7,281,920 | B2 | 10/2007 | Homola et al. |
| 7,292,329 | B2 | 11/2007 | Treves et al. |
| 7,301,726 | B1 | 11/2007 | Suzuki |
| 7,302,148 | B2 | 11/2007 | Treves et al. |
| 7,305,119 | B2 | 12/2007 | Treves et al. |
| 7,314,404 | B2 | 1/2008 | Singh et al. |
| 7,320,584 | B1 | 1/2008 | Harper et al. |
| 7,329,114 | B2 | 2/2008 | Harper et al. |
| 7,375,362 | B2 | 5/2008 | Treves et al. |
| 7,420,886 | B2 | 9/2008 | Tomiyasu et al. |
| 7,425,719 | B2 | 9/2008 | Treves et al. |
| 7,471,484 | B2 | 12/2008 | Wachenschwanz et al. |
| 7,498,062 | B2 | 3/2009 | Calcaterra et al. |
| 7,531,485 | B2 | 5/2009 | Hara et al. |
| 7,537,846 | B2 | 5/2009 | Ishiyama et al. |
| 7,549,209 | B2 | 6/2009 | Wachenschwanz et al. |
| 7,569,490 | B2 | 8/2009 | Staud |
| 7,597,792 | B2 | 10/2009 | Homola et al. |
| 7,597,973 | B2 | 10/2009 | Ishiyama |
| 7,608,193 | B2 | 10/2009 | Wachenschwanz et al. |
| 7,632,087 | B2 | 12/2009 | Homola |
| 7,656,615 | B2 | 2/2010 | Wachenschwanz et al. |
| 7,682,546 | B2 | 3/2010 | Harper |
| 7,684,152 | B2 | 3/2010 | Suzuki et al. |
| 7,686,606 | B2 | 3/2010 | Harper et al. |
| 7,686,991 | B2 | 3/2010 | Harper |
| 7,695,833 | B2 | 4/2010 | Ishiyama |
| 7,722,968 | B2 | 5/2010 | Ishiyama |
| 7,733,605 | B2 | 6/2010 | Suzuki et al. |
| 7,736,768 | B2 | 6/2010 | Ishiyama |
| 7,755,861 | B1 | 7/2010 | Li et al. |
| 7,758,732 | B1 | 7/2010 | Calcaterra et al. |
| 7,833,639 | B2 | 11/2010 | Sonobe et al. |
| 7,833,641 | B2 | 11/2010 | Tomiyasu et al. |
| 7,910,159 | B2 | 3/2011 | Jung |
| 7,911,736 | B2 | 3/2011 | Bajorek |
| 7,924,519 | B2 | 4/2011 | Lambert |
| 7,944,165 | B1 | 5/2011 | O'Dell |
| 7,944,643 | B1 | 5/2011 | Jiang et al. |
| 7,955,723 | B2 | 6/2011 | Umezawa et al. |
| 7,983,003 | B2 | 7/2011 | Sonobe et al. |
| 7,993,497 | B2 | 8/2011 | Moroishi et al. |
| 7,993,765 | B2 | 8/2011 | Kim et al. |
| 7,998,912 | B2 | 8/2011 | Chen et al. |
| 8,002,901 | B1 | 8/2011 | Chen et al. |
| 8,003,237 | B2 | 8/2011 | Sonobe et al. |
| 8,012,920 | B2 | 9/2011 | Shimokawa |
| 8,038,863 | B2 | 10/2011 | Homola |
| 8,057,926 | B2 | 11/2011 | Ayama et al. |
| 8,062,778 | B2 | 11/2011 | Suzuki et al. |
| 8,064,156 | B1 | 11/2011 | Suzuki et al. |
| 8,076,013 | B2 | 12/2011 | Sonobe et al. |
| 8,092,931 | B2 | 1/2012 | Ishiyama et al. |
| 8,100,685 | B1 | 1/2012 | Harper et al. |
| 8,101,054 | B2 | 1/2012 | Chen et al. |
| 8,125,723 | B1 | 2/2012 | Nichols et al. |
| 8,125,724 | B1 | 2/2012 | Nichols et al. |
| 8,137,517 | B1 | 3/2012 | Bourez |
| 8,142,916 | B2 | 3/2012 | Umezawa et al. |
| 8,163,093 | B1 | 4/2012 | Chen et al. |
| 8,171,949 | B1 | 5/2012 | Lund et al. |

(56) References Cited

U.S. PATENT DOCUMENTS

| | | | |
|---|---|---|---|
| 8,173,282 B1 | 5/2012 | Sun et al. | |
| 8,178,480 B2 * | 5/2012 | Hamakubo et al. | 508/582 |
| 8,206,789 B2 | 6/2012 | Suzuki | |
| 8,218,260 B2 | 7/2012 | Iamratanakul et al. | |
| 8,247,095 B2 | 8/2012 | Champion et al. | |
| 8,257,783 B2 | 9/2012 | Suzuki et al. | |
| 8,298,609 B1 | 10/2012 | Liew et al. | |
| 8,298,689 B2 | 10/2012 | Sonobe et al. | |
| 8,309,239 B2 | 11/2012 | Umezawa et al. | |
| 8,316,668 B1 | 11/2012 | Chan et al. | |
| 8,331,056 B2 | 12/2012 | O'Dell | |
| 8,354,618 B1 | 1/2013 | Chen et al. | |
| 8,367,228 B2 | 2/2013 | Sonobe et al. | |
| 8,383,209 B2 | 2/2013 | Ayama | |
| 8,394,243 B1 | 3/2013 | Jung et al. | |
| 8,397,751 B1 | 3/2013 | Chan et al. | |
| 8,399,809 B1 | 3/2013 | Bourez | |
| 8,402,638 B1 | 3/2013 | Treves et al. | |
| 8,404,056 B1 | 3/2013 | Chen et al. | |
| 8,404,369 B2 | 3/2013 | Ruffini et al. | |
| 8,404,370 B2 | 3/2013 | Sato et al. | |
| 8,406,918 B1 | 3/2013 | Tan et al. | |
| 8,414,966 B2 | 4/2013 | Yasumori et al. | |
| 8,425,975 B2 | 4/2013 | Ishiyama | |
| 8,431,257 B2 | 4/2013 | Kim et al. | |
| 8,431,258 B2 | 4/2013 | Onoue et al. | |
| 8,453,315 B2 | 6/2013 | Kajiwara et al. | |
| 8,488,276 B1 | 7/2013 | Jung et al. | |
| 8,491,800 B1 | 7/2013 | Dorsey | |
| 8,492,009 B1 | 7/2013 | Homola et al. | |
| 8,492,011 B2 | 7/2013 | Itoh et al. | |
| 8,496,466 B1 | 7/2013 | Treves et al. | |
| 8,517,364 B1 | 8/2013 | Crumley et al. | |
| 8,517,657 B2 | 8/2013 | Chen et al. | |
| 8,524,052 B1 | 9/2013 | Tan et al. | |
| 8,530,065 B1 | 9/2013 | Chernyshov et al. | |
| 8,546,000 B2 | 10/2013 | Umezawa | |
| 8,551,253 B2 | 10/2013 | Na'im et al. | |
| 8,551,627 B2 | 10/2013 | Shimada et al. | |
| 8,556,566 B1 | 10/2013 | Suzuki et al. | |
| 8,559,131 B2 | 10/2013 | Masuda et al. | |
| 8,562,748 B1 | 10/2013 | Chen et al. | |
| 8,565,050 B1 | 10/2013 | Bertero et al. | |
| 8,570,844 B1 | 10/2013 | Yuan et al. | |
| 8,580,410 B2 | 11/2013 | Onoue | |
| 8,584,687 B1 | 11/2013 | Chen et al. | |
| 8,591,709 B1 | 11/2013 | Lim et al. | |
| 8,592,061 B2 | 11/2013 | Onoue et al. | |
| 8,596,287 B1 | 12/2013 | Chen et al. | |
| 8,597,723 B1 | 12/2013 | Jung et al. | |
| 8,603,649 B2 | 12/2013 | Onoue | |
| 8,603,650 B2 | 12/2013 | Sonobe et al. | |
| 8,605,388 B2 | 12/2013 | Yasumori et al. | |
| 8,605,555 B1 | 12/2013 | Chernyshov et al. | |
| 8,608,147 B1 | 12/2013 | Yap et al. | |
| 8,609,263 B1 | 12/2013 | Chernyshov et al. | |
| 8,619,381 B2 | 12/2013 | Moser et al. | |
| 8,623,528 B2 | 1/2014 | Umezawa et al. | |
| 8,623,529 B2 | 1/2014 | Suzuki | |
| 8,634,155 B2 | 1/2014 | Yasumori et al. | |
| 8,658,003 B1 | 2/2014 | Bourez | |
| 8,658,292 B1 | 2/2014 | Mallary et al. | |
| 8,665,541 B2 | 3/2014 | Saito | |
| 8,668,953 B1 | 3/2014 | Buechel-Rimmel | |
| 8,674,327 B1 | 3/2014 | Poon et al. | |
| 8,685,214 B1 | 4/2014 | Moh et al. | |
| 8,696,404 B2 | 4/2014 | Sun et al. | |
| 8,711,499 B1 | 4/2014 | Desai et al. | |
| 8,743,666 B1 | 6/2014 | Bertero et al. | |
| 8,758,912 B2 | 6/2014 | Srinivasan et al. | |
| 8,787,124 B1 | 7/2014 | Chernyshov et al. | |
| 8,787,130 B1 | 7/2014 | Yuan et al. | |
| 8,791,391 B2 | 7/2014 | Bourez | |
| 8,795,765 B2 | 8/2014 | Koike et al. | |
| 8,795,790 B2 | 8/2014 | Sonobe et al. | |
| 8,795,857 B2 | 8/2014 | Ayama et al. | |
| 2001/0009729 A1 * | 7/2001 | Liu et al. | 428/694 TF |
| 2002/0048693 A1 | 4/2002 | Tanahashi et al. | |
| 2002/0060883 A1 | 5/2002 | Suzuki | |
| 2003/0022024 A1 | 1/2003 | Wachenschwanz | |
| 2004/0022387 A1 | 2/2004 | Weikle | |
| 2004/0132301 A1 | 7/2004 | Harper et al. | |
| 2004/0202793 A1 | 10/2004 | Harper et al. | |
| 2004/0202865 A1 | 10/2004 | Homola et al. | |
| 2004/0209123 A1 | 10/2004 | Bajorek et al. | |
| 2004/0209470 A1 | 10/2004 | Bajorek | |
| 2005/0036223 A1 | 2/2005 | Wachenschwanz et al. | |
| 2005/0142990 A1 | 6/2005 | Homola | |
| 2005/0150862 A1 | 7/2005 | Harper et al. | |
| 2005/0151282 A1 | 7/2005 | Harper et al. | |
| 2005/0151283 A1 | 7/2005 | Bajorek et al. | |
| 2005/0151300 A1 | 7/2005 | Harper et al. | |
| 2005/0155554 A1 | 7/2005 | Saito | |
| 2005/0167867 A1 | 8/2005 | Bajorek et al. | |
| 2005/0263401 A1 | 12/2005 | Olsen et al. | |
| 2006/0052262 A1 | 3/2006 | Akada et al. | |
| 2006/0147758 A1 | 7/2006 | Jung et al. | |
| 2006/0181697 A1 | 8/2006 | Treves et al. | |
| 2006/0207890 A1 | 9/2006 | Staud | |
| 2007/0060487 A1 * | 3/2007 | Burns et al. | 508/582 |
| 2007/0070549 A1 | 3/2007 | Suzuki et al. | |
| 2007/0225183 A1 | 9/2007 | Sasa et al. | |
| 2007/0245909 A1 | 10/2007 | Homola | |
| 2008/0024923 A1 * | 1/2008 | Tomimoto et al. | 360/235.8 |
| 2008/0075845 A1 | 3/2008 | Sonobe et al. | |
| 2008/0093760 A1 | 4/2008 | Harper et al. | |
| 2009/0117408 A1 | 5/2009 | Umezawa et al. | |
| 2009/0136784 A1 | 5/2009 | Suzuki et al. | |
| 2009/0169922 A1 | 7/2009 | Ishiyama | |
| 2009/0191331 A1 | 7/2009 | Umezawa et al. | |
| 2009/0202866 A1 | 8/2009 | Kim et al. | |
| 2009/0311557 A1 | 12/2009 | Onoue et al. | |
| 2010/0143752 A1 | 6/2010 | Ishibashi et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0225217 A1 | 9/2012 | Itoh et al. | |
| 2012/0251842 A1 | 10/2012 | Yuan et al. | |
| 2012/0251846 A1 | 10/2012 | Desai et al. | |

(56) References Cited

U.S. PATENT DOCUMENTS

| | | |
|---|---|---|
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yl et al. |
| 2014/0151360 A1 | 6/2014 | Landdell et al. |

\* cited by examiner

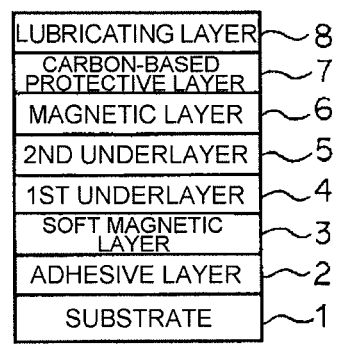

MAGNETIC DISK AND METHOD OF MANUFACTURING THE SAME

TECHNICAL FIELD

This invention relates to a magnetic disk adapted to be mounted in a magnetic disk device such as a hard disk drive (hereinafter abbreviated as a HDD).

BACKGROUND ART

Various information recording techniques have been developed following the increase in volume of information processing in recent years. Particularly, the areal recording density of HDDs using the magnetic recording technique has been increasing at an annual rate of about 100%. Recently, the information recording capacity exceeding 60 GB has been required per 2.5-inch magnetic disk adapted for use in a HDD or the like. In order to satisfy such a requirement, it is necessary to realize an information recording density exceeding 100 Gbits/inch$^2$. In order to achieve the high recording density in a magnetic disk for use in a HDD or the like, it is necessary to reduce the size of magnetic crystal grains forming a magnetic recording layer serving to record information signals, and further, to reduce the thickness of the layer. However, in the case of conventionally commercialized magnetic disks of the in-plane magnetic recording type (also called the longitudinal magnetic recording type or the horizontal magnetic recording type), as a result of the advance in size reduction of magnetic crystal grains, there has been the occurrence of a thermal fluctuation phenomenon where the thermal stability of recorded signals is degraded due to superparamagnetism so that the recorded signals are lost. This has been an impeding factor for the increase in recording density of the magnetic disks.

In order to solve this impeding factor, magnetic recording media of the perpendicular magnetic recording type have been proposed in recent years. In the case of the perpendicular magnetic recording type, as is different from the case of the in-plane magnetic recording type, the easy magnetization axis of a magnetic recording layer is adjusted so as to be oriented in a direction perpendicular to the surface of a substrate. As compared with the in-plane recording type, the perpendicular magnetic recording type can suppress the thermal fluctuation phenomenon and thus is suitable for increasing the recording density. As such a perpendicular magnetic recording medium, there is known a so-called two-layer perpendicular magnetic recording disk comprising, over a substrate, a soft magnetic underlayer made of a soft magnetic substance and a perpendicular magnetic recording layer made of a hard magnetic substance, as is described in, for example, JP-A-2002-74648.

In the meantime, a conventional magnetic disk has a protective layer and a lubricating layer on a magnetic recording layer formed over a substrate, for the purpose of ensuring the durability and reliability of the magnetic disk. Particularly, the lubricating layer used at the outermost surface is required to have various properties such as long-term stability, chemical substance resistance, friction properties, and heat resistance.

In order to satisfy such a requirement, perfluoropolyether-based lubricants having hydroxyl groups in molecules have often been used conventionally as lubricants for magnetic disks. For example, according to JP-A-Sho-62-66417 (Patent Document 1) or the like, there is well known a magnetic recording medium or the like coated with a perfluoroalkylpolyether lubricant having a structure of $HOCH_2CF_2O(C_2F_4O)_p(CF_2O)_qCH_2OH$ with hydroxyl groups at both ends of a molecule. It is known that when hydroxyl groups are present in molecules of a lubricant, the adhesion properties of the lubricant to a protective layer can be obtained by the interaction between the protective layer and the hydroxyl groups.

Patent Document 1: JP-A-S62-66417

DISCLOSURE OF THE INVENTION

Problem to be Solved by the Invention

As described above, the information recording density of 100 Gbits/inch$^2$ or more has been required in recent HDDs. One reason for this is related to the fact that, in addition to the conventional need as storage devices for computers, the HDDs have been mounted in mobile phones, car navigation systems, digital cameras, and so on.

In the case of these new uses, since the housing space for mounting the HDD is extremely small as compared with that of the computer, it is necessary to miniaturize the HDD. For this, it is necessary to reduce the diameter of a magnetic disk to be mounted in the HDD. For example, a 3.5-inch or 2.5-inch magnetic disk can be used for the computer use, but in the case of the above-mentioned new uses, use is made of a small-diameter magnetic disk of, for example, 1.8 inches to 0.8 inches smaller in diameter than the magnetic disk for the computer use. It is necessary to store a certain or more information volume even when the magnetic disk is reduced in diameter as described above, thus resulting in acceleration of improvement in information recording density.

Further, in order to effectively use the limited disk area, use has been made of a HDD of the LUL (Load Unload) system instead of the conventional CSS (Contact Start and Stop) system. In the LUL system, a magnetic head is retreated to an inclined platform called a ramp located outside a magnetic disk while the HDD is stopped, then in a start-up operation, the magnetic head is caused to slide from the ramp, after the magnetic disk starts to rotate, so as to fly over the magnetic disk to perform recording/reproduction. In a stop operation, the magnetic head is retreated to the ramp outside the magnetic disk, then the rotation of the magnetic disk is stopped. This sequence of the operations is called a LUL operation. In the magnetic disk mounted in the HDD of the LUL system, it is not necessary to provide a contact sliding region (CSS region) for the magnetic head, which is required in the CSS system, thus it is possible to increase a recording/reproducing region and therefore the LUL system is preferable for increasing the information capacity.

In order to improve the information recording density under these circumstances, it is necessary to reduce a spacing loss as much as possible by reducing the flying height of the magnetic head. In order to achieve the information recording density of 100 Gbits/inch$^2$ or more, it is necessary to set the flying height of the magnetic head to 10 nm or less. In the LUL system, as is different from the CSS system, since it is not necessary to provide an uneven shape for CSS on the surface of the magnetic disk, it is possible to significantly smooth the surface of the magnetic disk. Consequently, in the case of the magnetic disk mounted in the HDD of the LUL system, the flying height of the magnetic head can be further reduced as compared with the CSS system and therefore there is also an advantage that it is possible to increase the S/N ratio of a recording signal and thus to contribute to an increase in recording capacity of the magnetic disk device.

Because of the further reduction in magnetic head flying height following the recent introduction of the LUL system, it has become necessary that the magnetic disk stably operate even in the case of the low flying height of 10 nm or less. Especially, as described above, the magnetic disks have been shifted from the in-plane magnetic recording type to the perpendicular magnetic recording type in recent years, so that an increase in capacity of the magnetic disks and a reduction in flying height following it have been strongly demanded.

When the flying height of a magnetic head becomes a low flying height of, for example, 10 nm or less, the magnetic head repeatedly exerts adiabatic compression and adiabatic expansion on a lubricating layer on the surface of a magnetic disk through air molecules while flying, so that the lubricating layer tends to be repeatedly subjected to heating and cooling and therefore a reduction in molecular weight of a lubricant forming the lubricating layer tends to be promoted. If the molecular weight of the lubricant is reduced, its fluidity increases so that its adhesion to a protective layer decreases. Then, it is considered that the lubricant with the increased fluidity is transferred and deposited on the magnetic head located in the extremely close positional relationship to make the flying posture thereof unstable, thus causing a fly stiction failure. Particularly, a recently introduced magnetic head with a NPAB (negative pressure) slider is considered to promote the transfer deposition phenomenon because it tends to suck the lubricant due to a strong vacuum created at the bottom surface of the magnetic head. The transferred and deposited lubricant may produce an acid such as hydrofluoric acid to thereby corrode an element portion of the magnetic head. Particularly, a magnetic head mounted with a magnetoresistive effect element tends to be corroded.

Further, recently, in order to increase the response speed of a magnetic disk device, the rotational speed of a magnetic disk is increased. For example, a small-diameter 1.8-inch magnetic disk device suitable for a mobile application enhances its response characteristics by rotating a magnetic disk at a high speed of 5400 rpm or more. When the magnetic disk is rotated at such a high speed, a lubricating layer moves (migrates) due to a centrifugal force caused by the rotation so that the thickness of the lubricating layer becomes nonuniform in the plane of the magnetic disk, resulting in actualization of a failure due to a contact between the surface of the magnetic disk and a magnetic head at its low flying height.

As described before, recently, magnetic disk devices have started to be often used not only as conventional storage devices of personal computers, but also as storage devices for mobile applications such as mobile phones and car navigation systems and, therefore, due to diversification of use applications, the environmental resistance required for magnetic disks has become very strict. Therefore, in view of these circumstances, it is urgently necessary, more than conventional, to further improve the durability of magnetic disks and the heat resistance and durability of lubricants forming lubricating layers, and so on.

Following the rapid improvement in information recording density of magnetic disks in recent years, it is required to reduce the magnetic spacing between a magnetic head and a recording layer of a magnetic disk and, therefore, it has become necessary to further reduce the thickness of a lubricating layer present between the magnetic head and the recording layer of the magnetic disk. A lubricant used as the lubricating layer at the outermost surface of the magnetic disk largely affects the durability of the magnetic disk. Even if the thickness of the lubricating layer is reduced, the stability and reliability are essential for the magnetic disk.

As described above, it is required to realize a magnetic disk excellent in long-term stability of a lubricating layer and having high reliability despite the reduction in magnetic spacing and the low flying height of a magnetic head following the increase in recording density in recent years and, further, due to diversification of use applications and so on, the environmental resistance required for magnetic disks has become very strict. Therefore, it is required, more than conventional, to further improve the properties such as the durability of lubricants, forming lubricating layers, that largely affect the durability of magnetic disks, particularly the LUL durability and the fixed-point flying properties (CFT properties) of the lubricants.

This invention has been made in view of these conventional circumstances and has an object to provide a magnetic disk that is excellent in durability, particularly in LUL durability and CFT properties, and thus has high reliability despite the low flying height of a magnetic head following the rapid increase in recording density in recent years and despite the very strict environmental resistance following the diversification of applications.

Means for Solving the Problem

As a result of intensive studies on the durability of a lubricant that largely affects the durability of a magnetic disk, the present inventors have found that the above-mentioned problems can be solved by the following inventions, and have completed this invention.

Specifically, this invention has the following configurations.

(Configuration 1)

A magnetic disk having at least a magnetic layer, a protective layer, and a lubricating layer provided in this order over a substrate, wherein the lubricating layer contains a compound having a perfluoropolyether main chain in a structure thereof and having a polar group other than at ends of a molecule thereof.

(Configuration 2)

The magnetic disk according to configuration 1, wherein the compound is a compound having a polar group near the center of a molecule thereof.

(Configuration 3)

The magnetic disk according to configuration 1 or 2, wherein the polar group is a hydroxyl group.

(Configuration 4)

The magnetic disk according to any one of configurations 1 to 3, wherein a number-average molecular weight of the compound contained in the lubricating layer is in a range of 1000 to 10000.

(Configuration 5)

The magnetic disk according to any one of configurations 1 to 4, wherein the protective layer is a carbon-based protective layer formed by a plasma CVD method.

(Configuration 6)

The magnetic disk according to any one of configurations 1 to 5, wherein the magnetic disk is adapted to be mounted in a magnetic disk device of a load unload system.

(Configuration 7)

A method of manufacturing a magnetic disk having at least a magnetic layer, a protective layer, and a lubricating layer provided in this order over a substrate, wherein the lubricating layer is formed by forming on the protective layer a film of a lubricant containing a compound obtained by reacting 2 equivalents of a perfluoropolyether compound having a perfluoropolyether main chain in a molecule thereof and having a hydroxyl group only at one end of the molecule with 1 equivalent of an aliphatic compound having a structure capable of reacting with the perfluoropolyether compound to form a hydroxyl group.

(Configuration 8)

The method of manufacturing a magnetic disk according to configuration 7, comprising exposing the magnetic disk to an atmosphere at 50° C. to 150° C. after forming the lubricating layer.

According to the invention of Configuration 1, the magnetic disk has at least the magnetic layer, the protective layer, and the lubricating layer provided in this order over the substrate, wherein the lubricating layer contains the compound having the perfluoropolyether main chain in its structure and having the polar group other than at the ends of its molecule. Therefore, there is obtained the magnetic disk that is more excellent in properties such as LUL durability and CFT properties than conventional and thus has high reliability despite the low flying height of a magnetic head following the rapid increase in recording density in recent years and further despite the very strict environmental resistance following the diversification of applications.

A perfluoropolyether-based lubricant often used conventionally has hydroxyl groups at both ends of a molecule and obtains its adhesion properties to a protective layer by the interaction between the protective layer and the hydroxyl groups. However, it has been found that the LUL durability or the CFT properties that can ensure sufficient long-term reliability cannot be obtained with the low flying height of a magnetic head following the rapid increase in recording density in recent years and further with the very strict environmental resistance following the diversification of applications. According to studies of the present inventors, the reason for this is considered that, with the low flying height of the magnetic head, particularly under a recent requirement for an ultra-low flying height of about 5 nm, and further with the very strict environmental resistance following the diversification of applications, an impulsive force applied to a lubricating layer from the magnetic head is very large and thus, in the case of the conventional lubricant that achieves its adhesion to a protective layer by the interaction between hydroxyl groups at both ends of its molecule and the protective layer, the interaction between the hydroxyl groups at the ends of the lubricant molecule and the protective layer tends to be cut off by a large impulsive force from the magnetic head to free the ends of the lubricant molecule and, even if the interaction with the protective layer is maintained at one of the ends of the molecule, the moving space of the freed end of the lubricant molecule is large and further the interaction between the lubricant and the protective layer is largely reduced, so that, with the ultra-low flying height of about 5 nm as described above, transfer of the lubricant onto the magnetic head is accelerated and, as a result, the LUL durability or the CFT properties that can ensure sufficient long-term reliability cannot be obtained.

On the other hand, in this invention, the lubricant contained in the lubricating layer has the polar group other than at the ends of its molecule and thus the adhesion to the protective layer is achieved by the interaction between this polar group and the protective layer. Therefore, the ends of the lubricant molecule are in a free state from the beginning and thus are prevented from directly receiving a large impulsive force from a magnetic head so that the impulsive force can be relaxed and, further, the interaction with the protective layer is maintained at a portion other than at the ends of the lubricant molecule. Accordingly, even if the ends of the molecule are in the free state, the moving space thereof is small and, therefore, even with an ultra-low flying height of, for example, about 5 nm, transfer of the lubricant onto the magnetic head is difficult to occur. As a result, the LUL durability or the CFT properties that can ensure sufficient long-term reliability can be obtained.

According to the invention of Configuration 2, the compound contained in the lubricating layer is particularly preferably the compound having the polar group near the center of its molecule. This is because the operation and effect of this invention can be most suitably exhibited.

According to the invention of Configuration 3, the hydroxyl group is particularly preferable as the polar group possessed by the compound. This is because the hydroxyl group has a large interaction with the protective layer, particularly a carbon-based protective layer, and thus can enhance the adhesion between the lubricating layer and the protective layer.

According to the invention of Configuration 4, the number-average molecular weight of the compound contained in the lubricating layer is particularly preferably in the range of 1000 to 10000. This is because it can have recoverability with proper viscosity to exhibit suitable lubrication performance and further have excellent heat resistance.

According to the invention of Configuration 5, the protective layer is particularly preferably the carbon-based protective layer formed by the plasma CVD method. This is because the carbon-based protective layer with a uniform and dense surface can be formed by the plasma CVD method, which is suitable for this invention.

According to the invention of Configuration 6, the magnetic disk of this invention is suitable as a magnetic disk adapted to be mounted in a magnetic disk device of, particularly, the LUL system. Because of the further reduction in magnetic head flying height following the introduction of the LUL system, the magnetic disk is required to stably operate even in the case of the low flying height of 10 nm or less. Therefore, the magnetic disk of this invention having high reliability even with the low flying height is suitable.

According to the invention of Configuration 7, the magnetic disk of this invention having high reliability even with the low flying height is obtained by a method of manufacturing a magnetic disk having at least a magnetic layer, a protective layer, and a lubricating layer provided in this order over a substrate, wherein the lubricating layer is formed by forming on the protective layer a film of a lubricant containing a compound obtained by reacting 2 equivalents of a perfluoropolyether compound having a perfluoropolyether main chain in a molecule thereof and having a hydroxyl group only at one end of the molecule with 1 equivalent of an aliphatic compound having a structure capable of reacting with the perfluoropolyether compound to form a hydroxyl group.

According to the invention of Configuration 8, the magnetic disk is exposed to an atmosphere at 50° C. to 150° C. after forming the lubricating layer in the magnetic disk manufacturing method of Configuration 7. This makes it possible to further improve the adhesion of the formed lubricating layer to the protective layer.

Effect of the Invention

According to this invention, it is possible to provide a magnetic disk that is excellent in durability, particularly in LUL durability and CFT properties, and thus has high reliability despite the low flying height of a magnetic head following the rapid increase in recording density in recent years and further despite the very strict environmental resistance following the diversification of applications.

BEST MODE FOR CARRYING OUT THE INVENTION

Hereinbelow, this invention will be described in detail based on an embodiment thereof.

A magnetic disk of this invention is a magnetic disk having at least a magnetic layer, a protective layer, and a lubricating layer provided in this order over a substrate, wherein the lubricating layer contains a compound having a perfluoropolyether main chain in a structure thereof and having a polar group other than at ends of a molecule thereof.

The above-mentioned compound (hereinafter referred to as the lubricant according to this invention) contained in the lubricating layer in the magnetic disk of this invention is a compound having a perfluoropolyether main chain in its structure and having a polar group other than at ends of its molecule.

As described above, the lubricant according to this invention contained in the lubricating layer is, for example, a compound having a polar group other than at both ends of a chain molecule having a perfluoropolyether main chain in its structure, but for allowing the function and effect of this invention to be exhibited most suitably, it is particularly preferably a compound, for example, having a polar group near the center of a chain molecule having a perfluoropolyether main chain in its structure.

As the polar group in this case, it needs to be a polar group that causes the occurrence of suitable interaction between the lubricant and the protective layer when the lubricant is formed into a film on the protective layer. For example, there is cited a hydroxyl group (—OH), an amino group (—NH$_2$), a carboxyl group (—COOH), an aldehyde group (—COH), a carbonyl group (—CO—), a sulfonic group (—SO$_3$H), or the like. Among them, the hydroxyl group is particularly preferable as the polar group. This is because the hydroxyl group has a large interaction with the protective layer, particularly a carbon-based protective layer, and thus can enhance the adhesion between the lubricating layer and the protective layer.

Specifically, as the lubricant according to this invention, there is preferably cited, for example, a compound in which perfluoropolyether groups each having a perfluoropolyether main chain in a structure thereof are bonded to each other through a divalent or trivalent bonding group having a polar group such as a hydroxyl group in a structure thereof, wherein the compound has the polar group near the center of a chain molecule thereof.

A group represented by, for example, the following formula (I) is preferably cited as the above-mentioned perfluoropolyether group.

Formula (I)

CF$_3$CF$_2$(OC$_2$F$_4$)$m$(OCF$_2$)$n$OCF$_2$CH$_2$O—    [Chemical Formula 1]

In the formula, m and n are each an integer of 1 or more.

According to the lubricant of this invention described above, it has the polar group other than at the ends of its molecule and thus the adhesion to the protective layer is achieved by the interaction between this polar group and the protective layer. Therefore, the ends of the lubricant molecule are in a free state from the beginning and thus are prevented from directly receiving a large impulsive force from a magnetic head so that the impulsive force can be relaxed. Further, the interaction with the protective layer is maintained at a portion other than at the ends of the lubricant molecule. Accordingly, even if the ends of the molecule are in the free state, the moving space thereof is small and, therefore, even with an ultra-low flying height of, for example, about 5 nm, transfer of the lubricant onto the magnetic head is difficult to occur. As a result, the LUL durability or the CFT properties that can ensure sufficient long-term reliability can be obtained.

As described above, by providing the lubricating layer containing the lubricant according to this invention, the magnetic disk is excellent in durability, particularly in LUL durability and CFT properties, even with the magnetic head ultra-low flying height of, for example, about 5 nm following the increase in recording density in recent years and with the very strict environmental resistance following the diversification of applications. Therefore, this invention is suitable for realizing a magnetic disk having high reliability (capable of ensuring stable operation) even under severe use conditions.

As a method of manufacturing the lubricant according to this invention, there is preferably cited, for example, a manufacturing method in which 2 equivalents of a perfluoropolyether compound having a perfluoropolyether main chain in a molecule thereof and having, for example, a hydroxyl group only at one end of the molecule are reacted with 1 equivalent of an aliphatic compound having a structure capable of reacting with the perfluoropolyether compound to form, for example, a hydroxyl group.

In order to form, for example, the hydroxyl group, there is preferably cited, as the above-mentioned aliphatic compound, a diepoxy compound having epoxide structures at ends of a molecule thereof. Using such a compound, it is possible to obtain the lubricant of this invention with high purity and high yield. Specific examples of such a diepoxy compound are given below, but this invention is not limited thereto.

[Chemical Formulas 2]

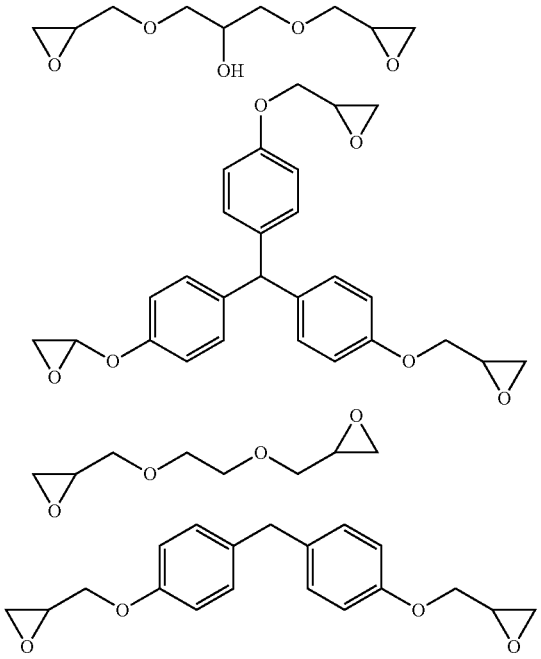

Specifically, under a base condition, perfluoropolyether compounds each having a hydroxyl group only at one end of its molecule are reacted with bases to form alkoxides, then these alkoxides perform a nucleophilic ring-opening reaction with an aliphatic compound having epoxide structures at ends thereof, thereby obtaining a dimer or trimer compound in which the perfluoropolyether compounds are bonded to each other through a bonding group changed from the aliphatic compound.

As the above-mentioned perfluoropolyether compound, there is cited, for example, a perfluorodiol compound having a hydroxyl group at one end of its molecule, represented by the following formula (II).

Formula (II)

    [Chemical Formula 3]

In the formula, m and n are each an integer of 1 or more.

According to the lubricant manufacturing method of this invention described above, the perfluoropolyether compounds are bonded to each other to be dimerized or trimerized so that it is possible to obtain a magnetic disk lubricant with at least two hydroxyl groups introduced approximately at the center of a molecule thereof. For example, when the perfluorodiol compound represented by the above-mentioned formula (II) is used as the above-mentioned perfluoropolyether compound and the first-cited diepoxy compound (having one hydroxyl group in its structure) among the examples given above is used as the above-mentioned aliphatic compound, there is obtained a lubricant compound having three hydroxyl groups as polar groups approximately at the center of a molecule thereof.

An exemplified compound of the lubricant according to this invention is given below, but this invention is not limited thereto.

[Chemical Formula 4]

Exemplified Compound

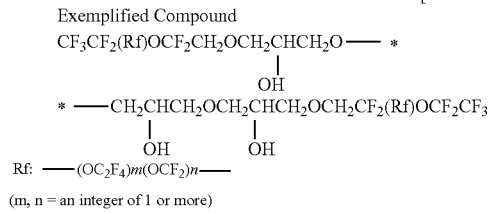

(m, n = an integer of 1 or more)

The molecular weight of the lubricant according to this invention is not particularly limited, but, for example, the number-average molecular weight (Mn) is preferably in the range of 1000 to 10000 and more preferably in the range of 1000 to 6000. This is because it can have recoverability with proper viscosity to exhibit suitable lubrication performance and further have excellent heat resistance.

Further, since the lubricant according to this invention comprises the compound in which the above-mentioned perfluoropolyether compounds are bonded to each other through the above-mentioned bonding group, there is obtained the high molecular weight lubricant by dimerization or trimerization of the above-mentioned perfluoropolyether and thus it is possible to suppress a reduction in molecular weight due to thermal decomposition. Therefore, when a magnetic disk is manufactured by the use of such a lubricant, it is possible to improve the heat resistance thereof. Because of the further reduction in magnetic head flying height (10 nm or less) following the increase in recording density in recent years, the possibility becomes high that contact or friction between a magnetic head and the surface of a magnetic disk frequently occurs. When the magnetic head is brought in contact with the surface of the magnetic disk, it may happen that the magnetic head does not immediately go out of contact with the surface of the magnetic disk, but slides with friction for a while.

Further, because of recording/reproduction performed by the high-speed rotation of a magnetic disk in recent years, heat due to contact or friction is generated more than conventional. Therefore, it is concerned that the possibility becomes higher than conventional that a material of a lubricating layer on the surface of the magnetic disk is thermally decomposed due to the generation of such heat, so that data read/write is subjected to failure due to adhesion, to a magnetic head, of the lubricant thermally decomposed to decrease in molecular weight and increase in fluidity. Further, in consideration of data recording/reproduction in the state where a magnetic head and a magnetic disk are in contact with each other in near future, the influence of heat generation due to the constant contact is further concerned. Taking this situation into account, it is desired that heat resistance required for a lubricating layer be further improved, and thus the lubricant of this invention is exactly suitable.

By carrying out molecular weight fractionation of the lubricant according to this invention by an appropriate method, the molecular weight dispersion (ratio of weight-average molecular weight (Mw)/number-average molecular weight (Mn)) is preferably set to 1.3 or less.

In this invention, it is not necessary to particularly limit a method for molecular weight fractionation, but, for example, use can be made of molecular weight fractionation by a gel permeation chromatography (GPC) method, molecular weight fractionation by a supercritical fluid extraction method, or the like.

When forming the lubricating layer by the use of the lubricant according to this invention, it can be formed by using a solution in which the lubricant is dispersed and dissolved in an appropriate solvent and coating the solution by, for example, a dipping method. As the solvent, use can be preferably made of, for example, a fluorine-based solvent (trade name Vertrel XF manufactured by DuPont-Mitsui Fluorochemicals Co., Ltd., or the like). A film forming method for the lubricating layer is, of course, not limited to the above-mentioned dipping method and use may be made of a film forming method such as a spin coating method, a spray method, or a paper coating method.

In this invention, in order to further improve the adhesion of the formed lubricating layer to the protective layer, the magnetic disk may be exposed to an atmosphere at 50° C. to 150° C. after the film formation.

In this invention, the thickness of the lubricating layer is preferably set to 4 to 18 Å. If it is less than 4 Å, there is a case where the lubrication performance as the lubricating layer is lowered. If it exceeds 18 Å, it is not preferable in terms of a reduction in film thickness, there is a case where the fly stiction failure occurs, and there is a case where the LUL durability is lowered.

As the protective layer in this invention, a carbon-based protective layer can be preferably used. Particularly, an amorphous carbon protective layer is preferable. With the protective layer being particularly the carbon-based protective layer, the interaction between the polar groups (particularly the hydroxyl groups) of the lubricant according to this invention and the protective layer is further enhanced so that the operation and effect of this invention are further exhibited, which is thus a preferable mode. The adhesion between the carbon-based protective layer and the lubricating layer can be controlled by forming the carbon-based protective layer of hydrogenated carbon and/or nitrogenated carbon and adjusting the content of hydrogen and/or nitrogen. In this case, the content of hydrogen is preferably set to 3 to 20 at % when measured by hydrogen forward scattering (HFS). The content of nitrogen is preferably set to 4 to 12 at % when measured by X-ray photoelectron spectroscopy (XPS).

In this invention, the carbon-based protective layer does not need to contain hydrogen and/or nitrogen uniformly over its entirety and is preferably a composition gradient layer containing, for example, nitrogen on its lubricating layer side and hydrogen on its magnetic layer side.

When using the carbon-based protective layer in this invention, it can be formed by, for example, a DC magnetron sputtering method, but it is preferably an amorphous carbon protective layer particularly formed by a plasma CVD method. Being formed by the plasma CVD method, the surface of the protective layer becomes uniform and dense. Therefore, it is preferable that the lubricating layer by this invention be formed on the protective layer with a smaller roughness formed by the CVD method.

In this invention, the thickness of the protective layer is preferably set to 20 to 70 Å. If it is less than 20 Å, there is a case where the performance as the protective layer is lowered. If it exceeds 70 Å, it is not preferable in terms of a reduction in film thickness.

In the magnetic disk of this invention, the substrate is preferably a glass substrate. The glass substrate is rigid and excellent in smoothness and thus is suitable for an increase in recording density. As the glass substrate, an aluminosilicate glass substrate, for example, is cited and, particularly, a chemically strengthened aluminosilicate glass substrate is preferable.

In this invention, the main surface of the substrate is preferably ultra-smooth with Rmax of 6 nm or less and Ra of 0.6 nm or less. The surface roughness Rmax and Ra herein referred to are based on the JIS B0601 standard.

The magnetic disk of this invention has at least the magnetic layer, the protective layer, and the lubricating layer provided over the substrate. In this invention, the magnetic layer is not particularly limited and may be an in-plane recording type magnetic layer or a perpendicular recording type magnetic layer. However, the perpendicular recording type magnetic layer is preferable for realizing the rapid increase in recording density in recent years. Particularly, if it is a CoPt-based magnetic layer, high coercive force and high reproduction output can be achieved, which is thus preferable.

In the magnetic disk of this invention, an underlayer may be provided between the substrate and the magnetic layer if necessary. Further, an adhesive layer, a soft magnetic layer, and so on may be provided between the underlayer and the substrate. In this case, as the underlayer, there is cited, for example, a Cr layer, a Ta layer, a Ru layer, a CrMo, CoW, CrW, CrV, or CrTi alloy layer, or the like and, as the adhesive layer, there is cited, for example, a CrTi, NiAl, or AlRu alloy layer or the like. Further, as the soft magnetic layer, there is cited, for example, a CoZrTa alloy film or the like.

The magnetic disk of this invention is suitable as a magnetic disk adapted to be mounted in a magnetic disk device of, particularly, the LUL system. Because of the further reduction in magnetic head flying height following the introduction of the LUL system, the magnetic disk is required to stably operate even in the case of a low flying height of 10 nm or less. Therefore, the magnetic disk of this invention having high reliability even with the low flying height is suitable.

EXAMPLE

Hereinbelow, this invention will be described in further detail with reference to an Example.

Example 1

FIG. 1 shows a magnetic disk 10 according to one Example of this invention.

The magnetic disk 10 has an adhesive layer 2, a soft magnetic layer 3, a first underlayer 4, a second underlayer 5, a magnetic layer 6, a carbon-based protective layer 7, and a lubricating layer 8 which are formed in this order on a substrate 1.

(Manufacture of Lubricant)

The above-exemplified lubricant compound was prepared by reacting 2 equivalents of the perfluorodiol compound represented by the above-mentioned formula (II) with 1 equivalent of the above-exemplified diepoxy compound under a base condition. Specifically, both of the compounds were agitated in acetone and then refluxed, with sodium hydroxide added thereto. The conditions such as reaction temperature and time were suitably set, respectively.

A lubricant comprising the compound thus obtained was properly subjected to molecular weight fractionation by the supercritical fluid extraction method.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as the disk substrate 1. The main surface of the disk substrate 1 was mirror-polished to Rmax of 2.13 nm and Ra of 0.20 nm.

On the disk substrate 1, the Ti-based adhesive layer 2, the Fe-based soft magnetic layer 3, the first underlayer 4 of NiW, the second underlayer 5 of Ru, and the magnetic layer 6 of CoCrPt were formed in this order in an Ar gas atmosphere by the DC magnetron sputtering method. This magnetic layer was a perpendicular magnetic recording type magnetic layer.

Subsequently, the diamond-like carbon protective layer 7 was formed to a thickness of 50 Å by the plasma CVD method.

Then, the lubricating layer 8 was formed in the following manner.

There was prepared a solution in which a lubricant (Mn measured by the NMR method was 4,000 and the molecular weight dispersion was 1.25) comprising the lubricant (the above-exemplified lubricant compound) of this invention manufactured as described above and subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer 7 was immersed therein and coated therewith by the dipping method, thereby forming the lubricating layer 8.

After the film formation, the magnetic disk was heat-treated in a vacuum furnace at 130° C. for 90 minutes. The thickness of the lubricating layer 8 was measured by a Fourier transform infrared spectrophotometer (FTIR) and it was 12 Å. In this manner, the magnetic disk 10 of Example 1 was obtained.

Then, the magnetic disk of Example 1 was evaluated by the following test methods.

(Evaluation of Magnetic Disk)

(1) First, a CFT property evaluation test (fixed-position flying test) was performed.

The fixed-point position was set to the disk inner peripheral side (disk radius 15 mm position). The CFT test was performed in an environment at a temperature of 70° C. and a relative humidity of 80% for the purpose of being performed in a severe environment.

As a result, it was seen that the magnetic disk of Example 1 was able to endure fixed-point continuous flying for continuous four weeks and thus was extremely excellent in CFT properties even under the severe conditions. The surface of a magnetic head and the surface of the magnetic disk after the CFT test were examined in detail using an optical microscope and an electron microscope and no damage or corrosion phenomenon was observed.

(2) Then, a LUL (Load Unload) durability test was performed for evaluating the LUL durability of the magnetic disk.

A LUL-system HDD (5400 rpm rotation type) was prepared and a magnetic head with a flying height of 5 nm and the magnetic disk of the Example were mounted therein. A slider of the magnetic head was a NPAB (negative pressure) slider and was mounted with a magnetoresistive effect element (GMR element) as a reproducing element. A shield portion was made of a FeNi-based permalloy alloy. By causing the LUL-system HDD to continuously repeat the LUL operations, the number of LUL times endured by the magnetic disk up to the occurrence of failure was measured.

As a result, the magnetic disk of Example 1 endured the LUL operations of 900,000 times with no failure at an ultra-low flying height of 5 nm. In a normal HDD using environment, use for about 10 years is generally required for the number of LUL times to exceed 400,000 times. Since a magnetic disk is currently judged to be preferable if it endures 600,000 times or more, it can be said that the magnetic disk of Example 1 has very high reliability.

The surface of the magnetic disk after the LUL durability test was observed in detail using an optical microscope and an electron microscope and was found to be excellent, i.e. no abnormality such as damage or dirt was observed. Further, the surface of the magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

For evaluating the thermal properties, the LUL durability test was performed in atmospheres of −20° C. to 50° C. With the magnetic disk of this Example, no particular failure occurred and the good results were obtained.

Comparative Example

As a lubricant, use was made of a conventional perfluoropolyether-based lubricant, Fomblin Z-DOL (trade name) manufactured by Solvay Solexis, Inc., having been subjected to molecular weight fractionation by the GPC method to have Mw of 3000 and a molecular weight dispersion of 1.08. Then, a solution in which this lubricant was dispersed and dissolved in a fluorine-based solvent, Vertrel XF (trade name) manufactured by DuPont-Mitsui Fluorochemicals Co., Ltd., was used as a coating solution and a magnetic disk formed with layers up to a protective layer was immersed therein and coated therewith by the dipping method, thereby forming a lubricating layer. Herein, the concentration of the coating solution was properly adjusted so that the lubricating layer was formed to a thickness in the range of 10 to 12 Å. A magnetic disk was manufactured in the same manner as in Example 1 except the above-mentioned point and was used as a Comparative Example.

Then, as a result of performing a CFT property evaluation test in the same manner as in the Example, a failure occurred before the lapse of continuous four weeks. That is, the magnetic disk of this Comparative Example is inferior in CFT properties under the severe conditions.

Further, as a result of performing a LUL durability test in the same manner as in the Example, the magnetic disk of this Comparative Example failed at 600,000 times with an ultra-low flying height of 5 nm. The surface of the magnetic disk after the LUL durability test was observed in detail using an optical microscope and an electron microscope and, as a result, damage or the like was slightly observed. Further, the surface of a magnetic head after the LUL durability test was observed in detail using an optical microscope and an electron microscope and, as a result, lubricant adhesion to the magnetic head and corrosion failure were observed.

BRIEF DESCRIPTION OF THE DRAWINGS

FIG. 1 is an exemplary cross-sectional view of a magnetic disk according to one Example of this invention.

DESCRIPTION OF SYMBOLS 1 substrate
2 adhesive layer
3 soft magnetic layer
4 first underlayer
5 second underlayer
6 magnetic layer
7 carbon-based protective layer
8 lubricating layer
10 magnetic disk

The invention claimed is:
1. A magnetic disk comprising:
a substrate, and
a magnetic layer, a protective layer, and a lubricating layer provided in this order over the substrate,
wherein said lubricating layer contains a compound having a perfluoropolyether main chain in a structure thereof and having at least three hydroxyl groups other than at ends of a molecule thereof, and wherein the ends of the molecule of the compound do not contain polar groups such that the ends are in a free state,
wherein the compound having a perfluoropolyether main chain is obtained by reacting a perfluorodiol compound represented by the following formula (II) and a diepoxy compound:

$$CF_3CF_2(OC_2F_4)m(OCF_2)nOCF_2CH_2OH \qquad \text{formula (II)}$$

wherein m and n are each an integer of 1 or more, and
wherein the diepoxy compound is represented by one of the following formulas:

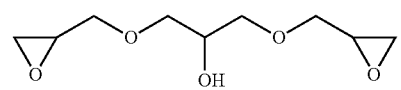

-continued

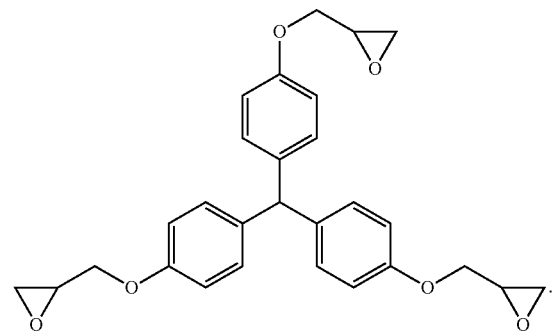 [SMILES: c1cc(C(c2ccc(OCC3CO3)cc2)c2ccc(OCC3CO3)cc2)ccc1OCC1CO1]

2. A magnetic disk according to claim 1, wherein a number-average molecular weight of said compound contained in said lubricating layer is in a range of 1000 to 10000.

3. A magnetic disk according to claim 1, wherein said protective layer is a carbon-based protective layer formed by a plasma CVD method.

4. A magnetic disk according to claim 1, wherein said magnetic disk is adapted to be mounted in a magnetic disk device of a load unload system.

5. A magnetic disk according to claim 2, wherein said protective layer is a carbon-based protective layer formed by a plasma CVD method.

6. A magnetic disk according to claim 2, wherein said magnetic disk is adapted to be mounted in a magnetic disk device of a load unload system.

7. A magnetic disk according to claim 3, wherein said magnetic disk is adapted to be mounted in a magnetic disk device of a load unload system.

8. A magnetic disk according to claim 1, wherein the diepoxy compound is represented by the following formula:

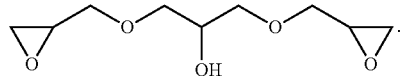 [SMILES: OC(COCC1CO1)COCC1CO1]

9. A magnetic disk according to claim 1, wherein the diepoxy compound is represented by the following formula:

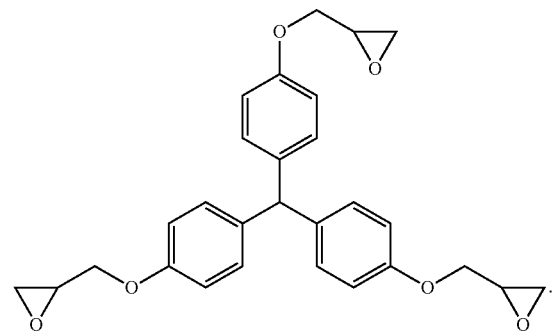 [SMILES: c1cc(C(c2ccc(OCC3CO3)cc2)c2ccc(OCC3CO3)cc2)ccc1OCC1CO1]

10. A magnetic disk according to claim 1, wherein the diepoxy compound is represented by the following formula:

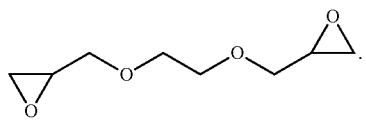 [SMILES: C(COCC1CO1)OCC1CO1]

11. A magnetic disk according to claim 1, wherein the diepoxy compound is represented by the following formula:

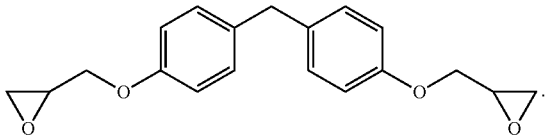 [SMILES: c1cc(OCC2CO2)ccc1Cc1ccc(OCC2CO2)cc1]

* * * * *